J. H. TURPIN.
ELECTRIC FLY KILLER.
APPLICATION FILED JUNE 6, 1921.
1,412,497.
Patented Apr. 11, 1922.
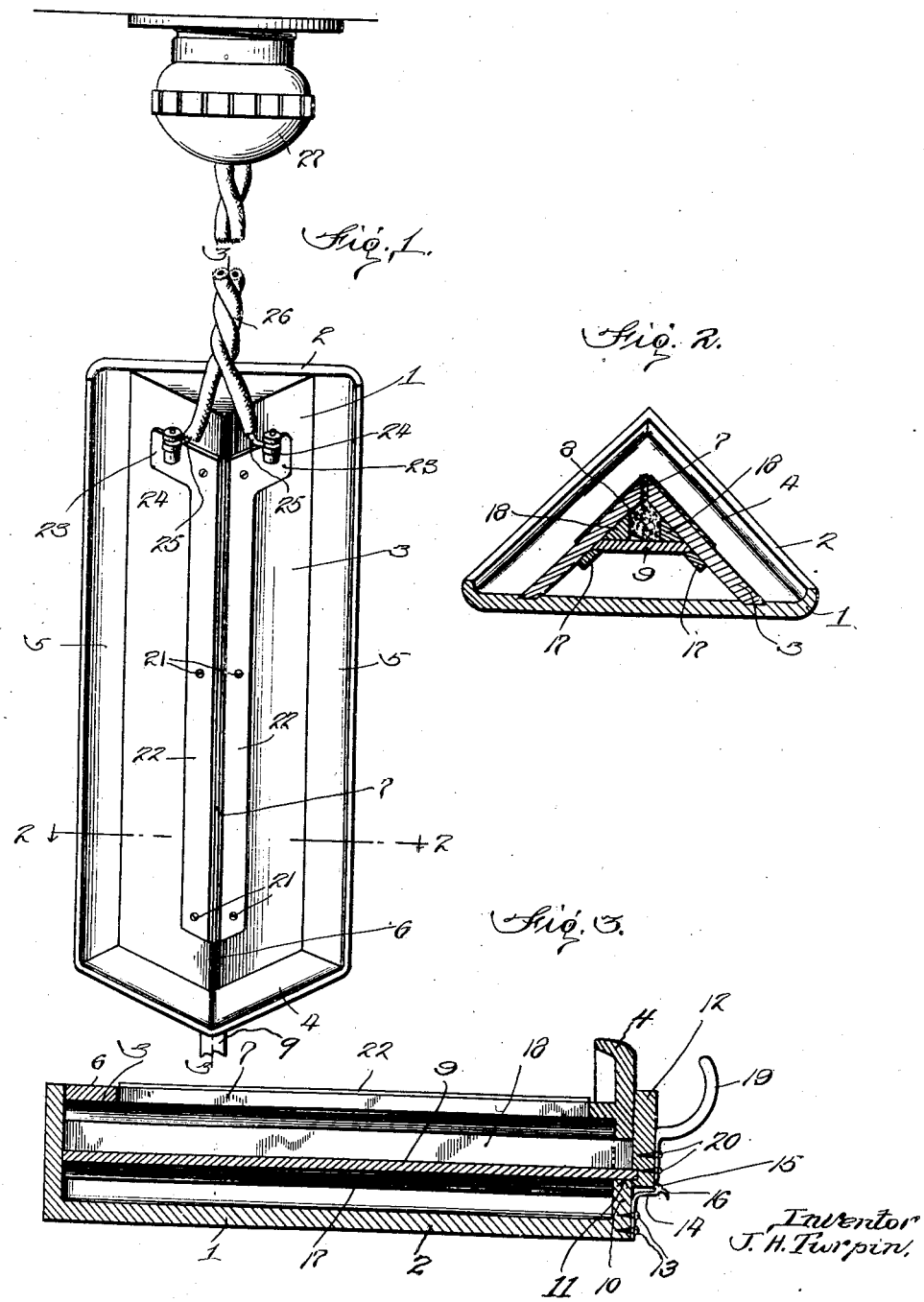
Inventor
J. H. Turpin,
Watson E. Coleman
Attorney.

UNITED STATES PATENT OFFICE.

JOHN H. TURPIN, OF BREMERTON, WASHINGTON.

ELECTRIC FLY KILLER.

1,412,497. Specification of Letters Patent. Patented Apr. 11, 1922.

Application filed June 6, 1921. Serial No. 475,368.

*To all whom it may concern:*

Be it known that I, JOHN H. TURPIN, a citizen of the United States, residing at Bremerton, in the county of Kitsap and State of Washington, have invented certain new and useful Improvements in Electric Fly Killers, of which the following is a specification, reference being had to the accompanying drawings.

It is the purpose of the present invention to provide a device of this kind embodying a container for suitable fly bait, with adjacent electrical conductor plates arranged in position close to an opening leading to the bait, so that when a fly is in the act of passing from one plate to another across the opening it is electrocuted, there being a trough or flange for catching the fly after its execution.

Another purpose is the provision of a trough adjacent the longitudinal edges and one end edge of a bait holder triangular in cross section, for receiving the flies.

Still another purpose is the provision of a device of this kind which may be suspended from cord containing electrical conductors (which are connected to the conductor plates), or disposed on a flat surface. When the device is suspended, the trough flanges at one end will catch the flies, and when the device is disposed on a flat surface, the trough flanges on the longitudinal edges of the triangular holder will receive the flies.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in perspective showing the improved electric fly killer as suspended from a cord containing electrical conductors.

Figure 2 is a cross sectional view on line 2—2 of Figure 1.

Figure 3 is a longitudinal sectional view on line 3—3 of Figure 1.

Referring to the drawings 1 designates the hollow bait enclosing body of the fly killer, which comprises a base 2 and a hollow triangular portion 3. The body is triangular in cross section and the lower end of the body has a marginal trough flange 4, while the base 2 is provided with opposite trough flanges 5. The trough flange 4 acts to receive the flies, when the fly killing device is suspended, while the flanges 5 act to receive the flies, when the device is disposed upon a flat surface.

The apex 6 of the hollow triangular portion is provided with an elongated opening or slot 7, so that the fly bait 8 may be sufficiently exposed, to attract the flies. The fly bait 8 is held in the hollow triangular portion of the body of the fly killer adjacent the slot or opening in the apex, by means of a slide 9.

The hollow bait enclosing body of the fly killer at one end is partially closed by means of the flange 10, there being an opening 11, to permit of the insertion of the slide 9, which has a base or bottom 12. Secured to the flange 10 by screws 13 is a spring catch 14, the shoulder 15 of which engages the base or bottom 12 of the slide, as at 16, to hold the slide in place. The slide 9 engages between the guides 17 and 18, while the fly bait 8 is held between the slide and the slotted apex, between the flanges 18. A suitable finger or hand piece 19 is secured upon the base or bottom of the slide by means of screws 20. By grasping the finger or hand piece, the slide may be withdrawn, for the purpose of refilling the hollow portion of the triangular part of the fly killer with fly bait.

The body of the fly killer comprising the portion 3 and the base 2 is constructed of some suitable nonconducting material, preferably fibre or the like, and secured by means of screws 21 to the diverging faces of the hollow triangular portion of the body are electrical conductors 22. These conductors have lateral ears 23, which are adjacent to and in contact with the faces of the triangular portion, and are provided with binding posts 24, to which electrical conductors 25 are connected. These conductors are insulated in the usual manner, and are twisted together to form a cord 26, which is connected to a conventional form of socket plug 27, which may be inserted in any suitable electric socket, for transmitting current to the conductors 22.

Obviously when the fly killer is supported upon a flat surface, or suspended, as shown, the odor and the exposure of the fly bait through the slot 7, will attract the flies, which will light upon the conductors 22, and as they crawl from one conductor to the other the flies become electrocuted. The flies will then fall on the flanges 5, provided the device is resting upon a flat surface, or upon the flange 4, if the device is suspended.

The invention having been set forth, what is claimed as being useful is:

1. An electrical fly killer comprising a body consisting of a base and a hollow triangular portion, means for holding fly bait in the triangular portion adjacent the apex thereof, said apex having an elongated opening through which the bait is exposed, electrical conductors on each side of the opening, and means connecting said conductors with a source of electricity, whereby the flies may be electrocuted when passing from one plate to the other over the opening.

2. In an electric fly killer, a hollow bait enclosing body, means for holding fly bait on the interior of the body, said body having an opening to expose the fly bait, means for retaining the holding means on the interior of the body, and electrocuting members on each side of the opening for electrocuting flies as they crawl from one member to the other.

3. In an electric fly killer, a hollow triangular body having guides on its interior, a slide engaging the guides for holding the fly bait in the hollow adjacent the apex of the body, means for retaining the slide in position, the apex of the body having a slot through which the fly bait is exposed, electrical conductor plates on each side of the slot, by which the flies are electrocuted when they crawl from one plate to the other over the slot.

4. In an electric fly killer, a hollow triangular body having guides on its interior, a slide engaging the guides for holding the fly bait in the hollow adjacent the apex of the body, means for retaining the slide in position, the apex of the body having a slot through which the fly bait is exposed, electrical conductor plates on each side of the slot, by which the flies are electrocuted when they crawl from one plate to the other through the slot, the longitudinal edges of the body having trough flanges for the reception of flies after being electrocuted.

5. An electrical fly killer comprising a body consisting of a base and a hollow triangular portion, means for holding fly bait in the triangular portion adjacent the apex thereon, said apex having an elongated opening through which the bait is exposed, electrical conductors on each side of the opening, and means connecting said conductors with a source of electricity, whereby the flies may be electrocuted when passing from one plate to the other over the opening, one end of the body and the longitudinal edges having a marginal trough flange for the reception of flies.

In testimony whereof I hereunto affix my signature.

JOHN H. TURPIN.